US008607319B2

(12) United States Patent
Peirce

(10) Patent No.: US 8,607,319 B2
(45) Date of Patent: Dec. 10, 2013

(54) METHODS AND SYSTEMS FOR DETERMINING BIOMETRIC DATA FOR USE IN AUTHENTICATION TRANSACTIONS

(75) Inventor: Michael Peirce, Dublin (IE)

(73) Assignee: Daon Holdings Limited, George Town (KY)

( * ) Notice: Subject to any disclaimer, the term of this patent is extended or adjusted under 35 U.S.C. 154(b) by 81 days.

(21) Appl. No.: 13/301,992

(22) Filed: Nov. 22, 2011

(65) Prior Publication Data

US 2013/0133049 A1 May 23, 2013

(51) Int. Cl.
*G06F 7/04* (2006.01)
*G06F 17/30* (2006.01)
*G06K 9/00* (2006.01)

(52) U.S. Cl.
USPC .............................. 726/6; 713/186; 382/115

(58) Field of Classification Search
USPC ..................... 726/6; 713/186; 382/115–127
See application file for complete search history.

(56) References Cited

U.S. PATENT DOCUMENTS

| | | | | |
|---|---|---|---|---|
| 5,963,656 A * | 10/1999 | Bolle et al. | ..................... | 382/124 |
| 6,160,903 A * | 12/2000 | Hamid et al. | ................. | 382/115 |
| 6,317,544 B1 * | 11/2001 | Diehl et al. | ................... | 385/115 |
| 6,330,345 B1 * | 12/2001 | Russo et al. | .................. | 382/115 |
| 6,446,210 B1 * | 9/2002 | Borza | .............................. | 726/4 |
| 7,542,590 B1 * | 6/2009 | Robinson et al. | ............. | 382/115 |
| 7,545,961 B2 * | 6/2009 | Ahern et al. | .................. | 382/115 |
| 7,545,962 B2 * | 6/2009 | Peirce et al. | .................. | 382/115 |
| 7,676,832 B2 * | 3/2010 | Rhee et al. | ........................ | 726/5 |
| 7,831,100 B2 * | 11/2010 | Gallagher | ..................... | 382/224 |
| 7,869,635 B2 * | 1/2011 | Hamid | ........................... | 382/124 |
| 7,995,802 B2 * | 8/2011 | Hu et al. | ........................ | 382/115 |
| 8,041,956 B1 | 10/2011 | White et al. | | |
| 2002/0154793 A1 * | 10/2002 | Hillhouse et al. | ............. | 382/115 |
| 2003/0068072 A1 * | 4/2003 | Hamid | ........................... | 382/124 |
| 2003/0233557 A1 * | 12/2003 | Zimmerman | ................. | 713/186 |
| 2004/0086157 A1 * | 5/2004 | Sukegawa | ..................... | 382/115 |
| 2004/0172535 A1 * | 9/2004 | Jakobsson et al. | ............ | 713/168 |
| 2004/0187037 A1 * | 9/2004 | Checco | ......................... | 713/202 |
| 2005/0039053 A1 * | 2/2005 | Walia | ............................ | 713/201 |
| 2005/0249381 A1 * | 11/2005 | Silvester et al. | ............. | 382/115 |
| 2006/0090079 A1 * | 4/2006 | Oh et al. | ....................... | 713/186 |
| 2006/0288234 A1 * | 12/2006 | Azar et al. | ..................... | 713/186 |
| 2007/0036355 A1 * | 2/2007 | Terauchi et al. | ................ | 380/44 |
| 2007/0150745 A1 * | 6/2007 | Peirce et al. | ................... | 713/186 |
| 2007/0248249 A1 * | 10/2007 | Stoianov | ....................... | 382/124 |
| 2008/0013806 A1 * | 1/2008 | Hamid | ........................... | 382/124 |
| 2008/0052527 A1 * | 2/2008 | Siedlarz | ........................ | 713/186 |
| 2008/0126961 A1 * | 5/2008 | Naaman et al. | ................ | 715/764 |
| 2008/0172725 A1 * | 7/2008 | Fujii et al. | ......................... | 726/5 |
| 2008/0178262 A1 * | 7/2008 | Taniguchi et al. | ................ | 726/2 |
| 2008/0212846 A1 * | 9/2008 | Yamamoto et al. | ........... | 382/115 |
| 2009/0037978 A1 * | 2/2009 | Luque et al. | ...................... | 726/2 |
| 2009/0193151 A1 * | 7/2009 | Adams et al. | ..................... | 710/5 |
| 2009/0203355 A1 * | 8/2009 | Clark | ............................ | 455/411 |

(Continued)

*Primary Examiner* — Michael Simitoski
(74) *Attorney, Agent, or Firm* — Kevin McDermott, Esq.

(57) ABSTRACT

A method for determining biometric data for use in conducting authentication transactions is provided that includes capturing biometric data from a user during an authentication transaction and capturing conditions of the authentication transaction with a device. The captured biometric data corresponds to desired biometric data. The method also includes transmitting the captured biometric data and conditions to an authentication system that stores biometric data and conditions therein. Moreover, the method includes determining that stored biometric data corresponding to the desired biometric data, associated with conditions that best match the captured conditions, is to be used for authenticating the user.

19 Claims, 5 Drawing Sheets

| 24 — | Data Record | Biometric Data 26 | Conditions 28 | | | |
|---|---|---|---|---|---|---|
| | | | Location 28-1 | Lighting 28-2 | Noise 28-3 | Temp. 28-4 |
| | 24-1 | Face | GPS-1 | Daylight | Noise | Hot |
| | 24-2 | Face | GPS-2 | Elec. Light | No Noise | Cold |
| | 24-3 | Face | GPS-3 | Night | Noise | Hot |
| | 24-4 | Face | GPS-4 | Daylight | Noise | Cold |
| | 24-5 | Voice | GPS-1 | Daylight | Noise | Hot |
| | 24-6 | Voice | GPS-2 | Daylight | Noise | Hot |
| | 24-7 | Voice | GPS-3 | Daylight | Noise | Cold |
| | 24-8 | Voice | GPS-4 | Night | No Noise | Cold |
| | 24-9 | Finger | GPS-1 | Daylight | Noise | Hot |
| | 24-10 | Finger | GPS-2 | Night | Noise | Cold |
| | 24-11 | Finger | GPS-3 | Daylight | Noise | Hot |
| | 24-12 | Finger | GPS-4 | Night | No Noise | Cold |

22

(56) References Cited

U.S. PATENT DOCUMENTS

| | | | |
|---|---|---|---|
| 2009/0232361 A1* | 9/2009 | Miller | 382/115 |
| 2010/0066546 A1* | 3/2010 | Aaron | 340/601 |
| 2010/0099446 A1* | 4/2010 | Panigrahi et al. | 455/466 |
| 2010/0115611 A1* | 5/2010 | Morihara | 726/19 |
| 2010/0162386 A1* | 6/2010 | Li et al. | 726/19 |
| 2010/0185637 A1* | 7/2010 | Morris et al. | 707/758 |
| 2010/0257369 A1* | 10/2010 | Baker | 713/186 |
| 2011/0033090 A1* | 2/2011 | Baughman et al. | 382/117 |
| 2011/0185413 A1* | 7/2011 | Fujii et al. | 726/7 |
| 2011/0188709 A1 | 8/2011 | Gupta et al. | |
| 2012/0102332 A1* | 4/2012 | Mullin | 713/186 |
| 2012/0283871 A1* | 11/2012 | Chai et al. | 700/237 |

* cited by examiner

| Data Record | Biometric Data 26 | Conditions 28 | | | |
|---|---|---|---|---|---|
| | | Location 28-1 | Lighting 28-2 | Noise 28-3 | Temp. 28-4 |
| 24-1 | Face | GPS-1 | Daylight | Noise | Hot |
| 24-2 | Face | GPS-2 | Elec. Light | No Noise | Cold |
| 24-3 | Face | GPS-3 | Night | Noise | Hot |
| 24-4 | Face | GPS-4 | Daylight | Noise | Cold |
| 24-5 | Voice | GPS-1 | Daylight | Noise | Hot |
| 24-6 | Voice | GPS-2 | Daylight | Noise | Hot |
| 24-7 | Voice | GPS-3 | Daylight | No Noise | Cold |
| 24-8 | Voice | GPS-4 | Night | Noise | Hot |
| 24-9 | Finger | GPS-1 | Daylight | Noise | Cold |
| 24-10 | Finger | GPS-2 | Night | Noise | Hot |
| 24-11 | Finger | GPS-3 | Daylight | Noise | Hot |
| 24-12 | Finger | GPS-4 | Night | No Noise | Cold |

FIG. 2

| Data Record 24 | Biometric Data 26 | Conditions 28 ||||
|---|---|---|---|---|---|
| | | Location 28-1 | Lighting 28-2 | Noise 28-3 | Temp.°F 28-4 |
| 24-1 | 2-Dimensional Face | GPS-1 | Daylight | Traffic | 95 |
| 24-2 | 2-Dimensional Face | GPS-2 | Elec. Light | Quiet | 26 |
| 24-3 | 2-Dimensional Face | GPS-3 | Night | Music | 93 |
| 24-4 | 2-Dimensional Face | GPS-4 | Daylight | Wind | 19 |
| 24-5 | Voice | GPS-1 | Daylight | Construction | 96 |
| 24-6 | Voice | GPS-2 | Daylight | Music | 101 |
| 24-7 | Voice | GPS-3 | Daylight | Traffic | 33 |
| 24-8 | Voice | GPS-4 | Night | Quiet | 15 |
| 24-9 | Finger – Left Thumb | GPS-1 | Daylight | Rain | 90 |
| 24-10 | Finger – Right Thumb | GPS-2 | Night | Music | 30 |
| 24-11 | Fingers of Left Hand | GPS-3 | Daylight | Traffic | 91 |
| 24-12 | Fingers of Right Hand | GPS-4 | Night | Quiet | 22 |

FIG. 3

| Rank | Data Record 24 | Biometric Data 26 | Conditions 28 ||||
|---|---|---|---|---|---|---|
| | | | Location 28-1 | Lighting 28-2 | Noise 28-3 | Temp. °F 28-4 |
| 1 | 24-4 | 2-Dimensional Face | GPS-4 | Daylight | Wind | 19 |
| 2 | 24-2 | 2-Dimensional Face | GPS-2 | Elec. Light | Quiet | 26 |
| 3 | 24-1 | 2-Dimensional Face | GPS-1 | Daylight | Traffic | 95 |
| 4 | 24-3 | 2-Dimensional Face | GPS-3 | Night | Music | 93 |

FIG. 4

METHODS AND SYSTEMS FOR DETERMINING BIOMETRIC DATA FOR USE IN AUTHENTICATION TRANSACTIONS

BACKGROUND OF THE INVENTION

This invention relates generally to biometric authentication transactions, and more particularly, to methods and systems for determining biometric data for use in conducting authentication transactions.

Users typically enroll in biometric authentication systems by providing biometric data for storage therein. Generally, during enrollment users present biometric data of a desired biometric modality for capture by a biometric data capture device. The captured biometric data is processed and then stored in the biometric authentication system as enrollment biometric data of the user. During authentication transactions, biometric data of the same desired biometric modality is captured from the user and is compared against the enrollment biometric data of the user in accordance with a biometric matching algorithm.

However, conditions existing while capturing biometric data during enrollment have been known to be different than conditions existing while capturing biometric data during an authentication transaction. These differences in conditions have been known to result in capturing different quality biometric data from the same user during enrollment versus during an authentication transaction. Because biometric matching algorithms are typically based on probabilities, such differences in quality may cause biometric authentication systems to generate erroneous authentication transaction results. For example, biometric authentication systems may erroneously identify genuine users as imposters or may erroneously identify imposters as genuine users. Such errors typically reduce the biometric authentication accuracy performance of biometric authentication systems.

Generally, efforts for improving accuracy performance of biometric authentication systems have focused on enhancing the mathematical and probabilistic functions of the biometric matching algorithms. However, such enhanced algorithms require substantial time and cost to develop while generally only marginally improving the accuracy performance of biometric authentication systems. Other methods for improving the accuracy performance of biometric authentication systems include replacing enrollment biometric data when the enrollment biometric data produces unusable or unacceptable results, and periodically replacing enrollment biometric data to combat temporal changes due to biometric template aging.

BRIEF DESCRIPTION OF THE INVENTION

In one aspect, a method for determining biometric data for use in conducting authentication transactions is provided. The method includes capturing biometric data from a user during an authentication transaction and capturing conditions of the authentication transaction with a device. The captured biometric data corresponds to desired biometric data. The method also includes transmitting the captured biometric data and conditions to an authentication system that stores biometric data and conditions therein. Moreover, the method includes determining that stored biometric data corresponding to the desired biometric data, associated with conditions that best match the captured conditions, is to be used for authenticating the user.

In another aspect, a computer system for determining biometric data for use in conducting authentication transactions is provided. The system includes a device for capturing biometric data during authentication transactions and for capturing conditions of authentication transactions. The system also includes an authentication system including an authentication database. The authentication system is configured to store within the database at least data record sets of users enrolled therein, and to communicate with the device over a network. Moreover, the authentication system is configured to compare desired biometric data captured from a user during an authentication transaction, as well as conditions captured during the transaction, against a data record set of the user. Furthermore, the authentication system is configured to determine that biometric data, included in the data record set, corresponding to the desired biometric data and being associated with conditions that best match the captured conditions, is to be used for authenticating the user.

In yet another aspect, a computer program recorded on a non-transitory computer-readable recording medium included in a condition-based authentication computer system for enabling increased accuracy of biometric authentication transaction results, is provided. The computer program includes instructions, which when read and executed by the condition-based authentication computer system, cause the condition-based authentication computer system to determine that biometric data stored therein corresponding to desired biometric data captured from a user during an authentication transaction, associated with conditions that best match conditions associated with the captured biometric data, is to be used for authenticating the user.

BRIEF DESCRIPTION OF THE DRAWINGS

FIG. 2 is a diagram illustrating an exemplary data record set of a user;

FIG. 3 is a diagram illustrating an alternative exemplary data record set of the user;

FIG. 4 is a diagram illustrating an exemplary ranking of data records; and

DETAILED DESCRIPTION OF THE INVENTION

Figure 1:
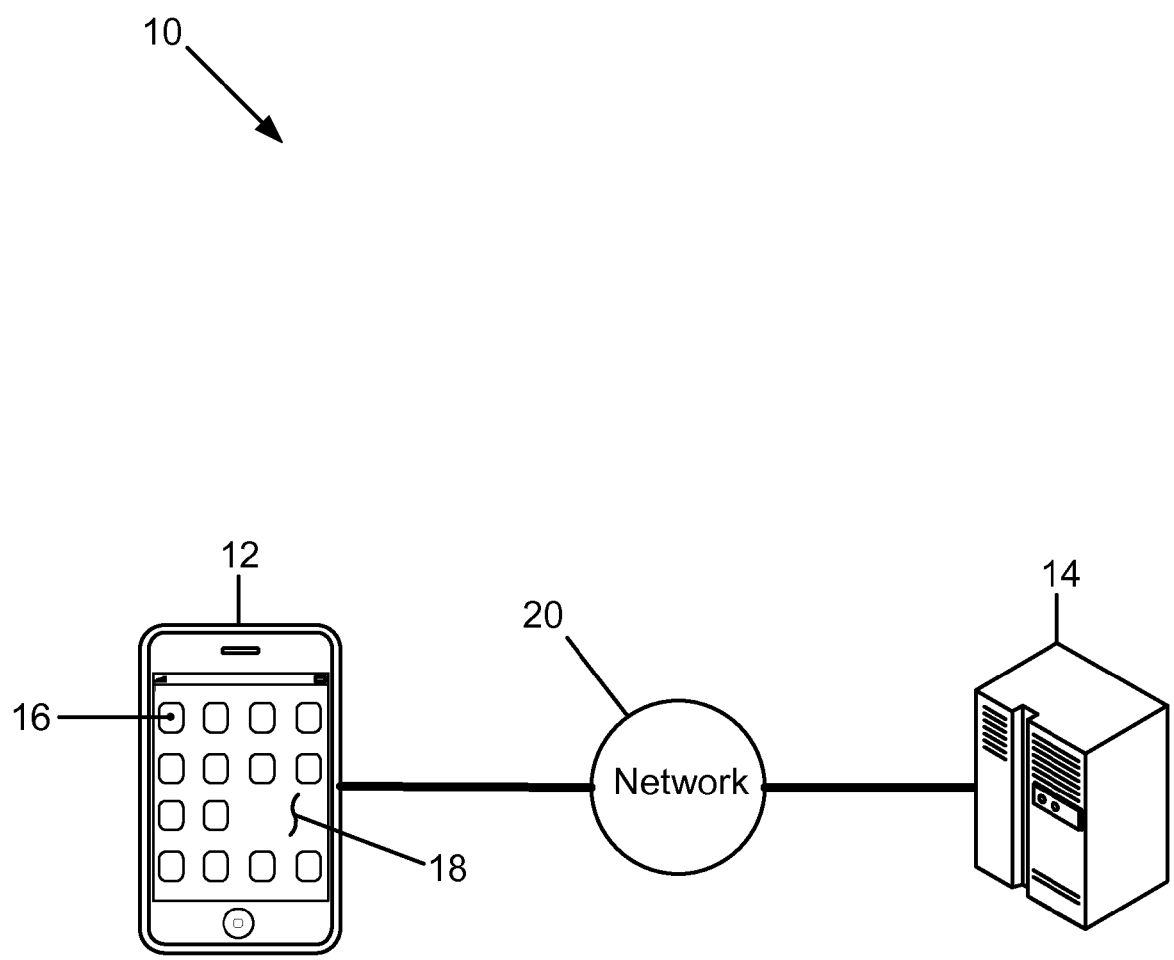
FIG. 1 is a block diagram of an exemplary embodiment of a Condition-Based Authentication Computer system for increasing the accuracy of authentication transaction results.

FIG. 1 is an expanded block diagram of an exemplary embodiment of a Condition-Based Authentication Computer (CBAC) System 10 for increasing the accuracy of authentication transaction results, and thereby improving the performance of systems conducting such authentication transactions. More specifically, the CBAC system 10 includes a communications device 12 and an Authentication Computer (AC) System 14. The communications device 12 is associated with a user.

The communications device 12 is a smart phone that stores applications and data therein, and displays at least one of text and images. The communications device 12 may include at least one of buttons and icons 16 for at least entering commands and invoking applications stored therein, and a display screen 18 such as, but not limited to, a Liquid Crystal Display (LCD), that displays at least one of text and images. Moreover, the communications device 12 may include cameras (not shown) and a microphone (not shown).

Applications stored in the communications device 12 may include a conditions evaluation application that causes the communications device 12 to capture conditions during an authentication transaction. For example, the conditions evaluation application may cause the communications device 12 to calculate its own global positioning system (GPS) coordinates while capturing biometric data. Moreover, the conditions evaluation application may cause the communications device to analyze the captured conditions as well as to derive conditions from captured biometric data. Such derived conditions may, for example, be the level of background noise detected from a captured voice sample. The conditions evaluation application may cause the communications device 12 to automatically evaluate and capture the conditions during an authentication transaction, or may cause the device 12 to prompt the user to manually enter values for one or more conditions to be evaluated and captured.

Although the communications device 12 is a smart phone in the exemplary CBAC system 10, the communications device 12 may alternatively be any device capable of at least storing data, displaying at least one of text and images, and capturing and transmitting data. Such other devices include, but are not limited to, a portable cellular phone, a tablet computer, a laptop computer, a personal computer, and any type of portable communications device having wireless capabilities such as a personal digital assistant (PDA).

The communications device 12 is configured to communicate with the AC system 14, other systems (not shown), and devices (not shown) over a communications network 20. The communications network 20 is a 3 G communications network. Alternatively, the communications network 20 may be any wireless network including, but not limited to, Wi-Fi, Global System for Mobile (GSM), Enhanced Data for GSM Evolution (EDGE), and any combination of a local area network (LAN), a wide area network (WAN) and the Internet. Moreover, the communications device 12 is configured to conduct at least wireless communications such as cellular telephone calls and to wirelessly access the Internet over the network 20.

The communications device 12 may be used to capture biometric data during authentication transactions. Moreover, the communications device 12 may determine whether captured biometric data is of sufficient quality for conducting an authentication transaction, and transmit the captured biometric data to the AC system 14 after determining it is of sufficient quality. Furthermore, the communications device 12 may process the captured biometric data prior to transmitting it to the AC system 14. For example, the communications device 12 may capture biometric data, create a biometric template from the captured data, and then transmit the biometric template to the AC system 14. Although the CBAC system 10 includes one communications device 12, the CBAC system 10 may alternatively include any number of communications devices 12 that are each associated with a same or different user.

The AC system 14 includes components such as, but not limited to, a web server, a database server, an application server, a directory server and a disk storage unit that may be used to store any kind of data. The disk storage unit may store at least one database such as, but not limited to, an authentication database. The authentication database stores at least authentication data of each of a plurality of users in data record sets. Authentication data includes at least biometric data. The AC system 14 also includes a database management server and an authentication server. The database management server may be used to facilitate transferring data to and from the disk storage device. The authentication server performs matching of any feature or information associated with users to authenticate the identity of users during authentication transactions. Authentication transactions as described herein include 1:1 verification transactions and 1:N identification transactions, where N is the number of data records searched. The AC system 14 is also configured to communicate with the communications device 12, other systems (not shown), and devices (not shown) over the network 20.

Biometric data is captured from each user during enrollment in the AC system 14, and is stored in a data record generated for the user. Biometric data included in a data record stored in the AC system 14 may be referred to herein as stored biometric data. The biometric data may alternatively be obtained by any other method such as, but not limited to, automatically reading or extracting the biometric data from identity documents or from legacy databases included in other computer systems. Likewise, biometric templates corresponding to the biometric data may be obtained by any method such as, but not limited to, automatically reading or extracting the biometric templates from identity documents or from legacy databases included in other computer systems. Templates corresponding to desired biometric data may be obtained in addition to, or instead of, the desired biometric data itself. Such other legacy database systems include, but are not limited to, systems associated with motor vehicle administrations, social security administrations, welfare system administrations, financial institutions and health care providers. Such identity documents include, but are not limited to, passports and driver's licenses. By extracting desired biometric data or biometric templates from a legacy database or identity document, and storing the extracted data in the AC system 14, users may be enrolled therein without having to directly provide biometric data.

The application server stores applications therein. For example, the application server may store at least a data selection application, an augmentation decision application, and the conditions evaluation application. The data selection application may cause the AC system 14 to identify, in any manner, data records that may be used for conducting an authentication transaction, and rank the identified data records in any manner. The augmentation decision application may cause the AC system 14 to at least determine whether biometric data and associated conditions captured while conducting an authentication transaction should be included in a data record that is added to a data record set of a user. Moreover, the augmentation decision application may cause the AC system 14 to determine, after a user is successfully authenticated, whether biometric data and associated conditions should be captured and included in a data record that is added to the data record set of the user.

The conditions evaluation application is the same conditions evaluation application stored in the communications device 12. Thus, the conditions evaluation application may cause the AC system 14 to perform the same functions it causes the communications device to perform. More specifically, the conditions evaluation application may cause the AC system 14 to at least analyze conditions captured during an authentication transaction and derive conditions from captured biometric data. For example, the conditions evaluation application may cause the AC system 14 to analyze voice biometric data, captured by the communications device 12, to detect background noise. Because the conditions evaluation application is stored in both the communications device 12 and the AC system 14, the conditions evaluation application may be executed by the communications device 12 at the authentication transaction location, or executed by the AC system 14 remotely from the authentication transaction location.

The AC system 14 may also store configurable authentication policies, some of which may be used to determine data that is to be captured or obtained from users during enrollment in the AC system 14, and others which may be used to determine data desired to be captured from users during authentication transactions.

The communications device 12 and the AC system 14, respectively, each include a processor (not shown) and a memory (not shown). It should be understood that, as used herein, the term processor is not limited to just those integrated circuits referred to in the art as a processor, but broadly refers to a computer, an application specific integrated circuit, and any other programmable circuit. It should be understood that the processors execute instructions, or computer programs, stored in the respective memories (not shown) of the communications device 12 and the AC system 14. The above examples are exemplary only, and are thus not intended to limit in any way the definition and/or meaning of the term "processor."

The respective memories (not shown) in the communications device 12 and the AC system 14 can be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), an optical ROM disc, such as a CD-ROM or DVD-ROM disc, and disc drive or the like.

Each of the memories (not shown) can be a computer-readable recording medium used to store data, respectively, in the communications device 12 and the AC system 14. Moreover, each of the respective memories (not shown) can be a computer-readable recording medium used to store computer programs or executable instructions that are executed, respectively, by the communications device 12 and the AC system 14. Furthermore, the memories (not shown) may include smart cards, SIMs or any other medium from which a computing device can read computer programs or executable instructions. As used herein, the term "computer program" is intended to encompass an executable program that exists permanently or temporarily on any computer-readable recordable medium that causes the computer or computer processor to execute the program and thus causes the computer to perform a function. Applications as described herein are computer programs.

FIG. 2 is a diagram illustrating an exemplary data record set 22 of a user enrolled in the AC system 14. More specifically, the data record set 22 includes data records 24 that each include biometric data 26 and associated conditions 28 under which the biometric data 26 was captured. Each data record 24 includes a different combination of biometric data 26 and conditions 28. The biometric data 26 may correspond to any biometric modality, or any combination of biometric modalities, desired to be used for conducting an authentication transaction. Such biometric modalities include, but are not limited to, voice, face, finger, iris, palm, and electrocardiogram, and any combination of voice, face, finger, iris, palm, and electrocardiogram. The biometric data is included in the data records 24 as biometric templates. The biometric templates are used by the AC system 14 for conducting authentication transactions.

The conditions 28 include, but are not limited to, the location 28-1, the type of lighting 28-2, the noise 28-3, and the temperature 28-4 during the authentication transaction. The location 28-1 is given in global positioning system (GPS) coordinates and is generally the location of the device 12 during the authentication transaction. The locations indicated as GPS-1, GPS-2, GPS-3, and GPS-4 each represent coordinates of a different location. The type of lighting 28-2 may be generated by the sun during daylight, generated by electrical devices, or may be the type of light encountered at night. The noise 28-3 includes, but is not limited to, office background noise, background noise created by wind or rain, and background noise generated by automobile traffic. The temperature 28-4 may include, but is not limited to, hot and cold temperatures. A hot temperature may be considered any temperature over 70 degrees Fahrenheit, while a cold temperature may be considered any temperature below 40 degrees Fahrenheit. The temperature 28-4 may also include other variations such as a moderate temperature for temperatures ranging between 40 and 70 degrees Fahrenheit.

The quality of captured biometric data is affected by the conditions 28 existing while capturing the biometric data. Different conditions affect different biometric modalities. For example, face biometric data capture is affected most by lighting conditions, not by background noise. Conversely, voice biometric data capture is affected most by background noise, not by lighting.

During enrollment in the AC system 14, desired biometric data is captured from a user, the conditions during enrollment are captured, and the captured biometric data and conditions are included in a data record 24 of the data record set 22 generated for the user. After enrollment, the augmentation decision application may cause the AC system 14 to determine, in any manner, whether or not a new data record 24 should be included in the data record set 22. The AC system 14 may determine that a new data record 24 is to be generated when the conditions captured during an authentication transaction are different than the conditions 26 of any data record 24 in the data record set 22.

For example, a bank may require capturing voice biometric data from a user inside the bank to enroll in the AC system 14, when the AC system 14 is associated with a bank. The captured biometric data and conditions existing during enrollment are stored as a data record 24 in the data record set 22 of the user. Later, the bank user may be authenticated against the enrollment voice biometric data outside the bank under conditions judged by the AC system 14 to be different from those existing during enrollment. The voice biometric data captured outside of the bank together with the different conditions may then be added to the data set 22 as a new data record 24 by the AC system 14.

As the AC system 14 is utilized to conduct authentication transactions under different conditions for each user, the number of data records 24 included in the data record set 22 of each respective user should increase. The more data records 24 included in the data record set 22 of a user, the more likely it is that the biometric data and conditions of an authentication transaction should be substantially similar to those of a data record 24 in the data record set 22. New data records 24 may also be generated by the AC system 14 and added to the data record set 22 during subsequent enrollments in the AC system 14 or after a successful authentication.

The augmentation decision application may also cause the AC system 14 to transmit a message to the communications device 12 requesting additional information from the user prior to determining whether or not a new data record should be generated. The additional information augments and is combined with the biometric data and conditions captured during authentication, prior to comparison against the data records 24. The additional information may include data regarding additional biometric data or conditions.

The data records 24 may also include data such as, but not limited to, raw biometric data captured from the user and personal data. The raw biometric data is generally processed to generate corresponding biometric templates which are also included in the data records 24. The raw biometric data may be used as the basis for conducting authentication transactions. Personal data includes any demographic information regarding a user including, but not limited to, the user's name, age, date-of-birth, address, citizenship and marital status. Each data record 24 may also include any kind of data that may be used to authenticate the identity of users as described herein.

The information shown in FIG. 3 is the same information shown in FIG. 2 as described in more detail below. As such, features illustrated in FIG. 3 that are identical to features illustrated in FIG. 2 are identified using the same reference numerals used in FIG. 2.

FIG. 3 is a diagram illustrating an alternative exemplary data record set 22 of a user enrolled in the AC system 14. This alternative embodiment is similar to that shown in FIG. 2. However, instead of generally describing the biometric data 26 as face, voice and finger, the biometric data 26 is more particularly described. More specifically, the face biometric data 26 of data records 24-1 to 24-4 is described as two-dimensional face biometric data. Two-dimensional face biometric data is generally provided in the form of a photograph. Moreover, the finger biometric data 26 of data records 24-9 to 24-12 is described as the left and right thumbs, respectively, for data records 24-9 and 24-10, and as the fingers of the left and right hands, respectively, for data records 24-11 and 24-12.

It should be understood that data records 24 may be generated for a user from biometric data and associated conditions captured during initial and subsequent enrollments in the AC system 14, from biometric data and associated conditions captured during authentication transactions, as well as from biometric data and associated conditions captured after a successful authentication. Captured biometric data may include biometric data corresponding to any number of different biometric modalities. Moreover, captured biometric data may include different types of biometric data of the same biometric modality. For example, as described above, captured biometric data may include finger biometric data of a user's left and right thumbs. Thus, the biometric data 26 of each data record 24 may include biometric data corresponding to any number of different biometric modalities and to any number of different types of the same biometric modality.

The captured noise 28-3 and temperature 28-4 condition data are described using the actual captured condition data. For example, the noise 28-3 condition data in data record 24-1 is indicated as traffic, which is the source of the noise. As another example, the temperature 28-4 condition data in data record 24-1 is indicated as 95 degrees Fahrenheit. It should be appreciated that any type of condition 28 may be captured and included in the data record set 22, and that each type of condition 28 may be included in the data records 24 in any manner that facilitates determining biometric data most likely to result in a successful authentication result as described herein.

The data records 24 may be ranked to facilitate determining the biometric data most likely to result in a successful authentication result. More specifically, after capturing desired biometric data from a user during an authentication transaction and capturing conditions existing during the transaction, the AC system 14 identifies those data records 24 of the user having biometric data corresponding to the desired biometric data, compares the captured conditions against the conditions 28 included in each of the identified data records, and determines a matching score for each comparison match. The higher the matching score, the better the match. The AC system 14 ranks the identified data records according to the matching scores. Consequently, identified data records with higher comparison matching scores are ranked higher than identified records with lower comparison matching scores. The identified data record associated with the highest matching score is given the highest rank, while the identified data record with the lowest matching score is given the lowest rank.

The AC system 14 also determines which conditions 28 most affect the quality of the desired biometric data, and assigns greater weight to those conditions when comparing the captured conditions against the conditions of an identified data record. By virtue of assigning greater weight to those conditions 28 that most affect the quality of the desired biometric data, the AC system 14 effectively determines which conditions 28 to use when comparing the captured conditions against the conditions of each data record 24 and the influence those determined conditions have on the comparison match. For example, because the quality of voice biometric data is affected most by background noise and is generally not affected by other conditions, the AC system 14 assigns greater weight to the noise condition 28-3 than to any of the other conditions. Specifically, the noise condition 28-3 may be assigned a weighting of one, while each of the other conditions is assigned a weighting of zero.

As another example, the AC system 14 may determine that the condition most affecting the quality of desired biometric data is the location 28-1 of the authentication transaction. Accordingly, the AC system 14 assigns a weighting of one to the location condition 28-1 and a weighting of zero to all other conditions. The AC system 14 compares the GPS coordinate location of the authentication transaction against the GPS coordinates of each data record 24 including biometric data corresponding to the desired biometric data. The data records 24 may be ranked according to their proximity to the location of the authentication transaction. If the GPS coordinates of the highest ranking data record 24 are within an acceptable distance of the authentication transaction location, the biometric data included in the highest ranking data record 24 may be used to confirm the identity of the user during the authentication transaction. If none of the data records 24 include GPS coordinates within an acceptable distance of the authentication location, the biometric data of a default data record 24 may be used to confirm the identity of the user. Although GPS coordinates are used in this example to illustrate how the location of an authentication transaction may be compared against locations of data record data, any method of determining locations may alternatively be used. It should be understood that any criteria may be used to determine which conditions 28 most affect the quality of desired biometric data.

The information shown in FIG. 4 includes some of the same information shown in FIG. 3 as described in more detail below. As such, features illustrated in FIG. 4 that are identical to features illustrated in FIG. 3 are identified using the same reference numerals used in FIG. 3.

FIG. 4 is a diagram illustrating an exemplary ranking 30 of data records 24 based on location. More specifically, each of the data records 24 includes two-dimensional face biometric data 26 and has been ranked according to its proximity to an authentication transaction conducted at location GPS-4. Data record 24-4 is the highest ranking data record because it was determined to be closest to the authentication transaction location. Data record 24-2 is the second highest ranking data record because it was determined to be second closest to the authentication transaction location. Data record 24-1 is the third highest ranking data record because it was determined to be the third closest to the authentication transaction location. Data record 24-3 is the lowest ranking data record because it was determined to be located furthest from the authentication transaction location. The biometric data 26 in the highest ranking data record 24-4 is considered the most suitable for authenticating a user during an authentication transaction because it is most likely to result in a successful authentication. The biometric data 26 in the second 24-2, third 24-1, and lowest 24-3 ranking data records is considered the second, third, and least suitable, respectively, for authenticating the user during an authentication transaction.

Figure 5:
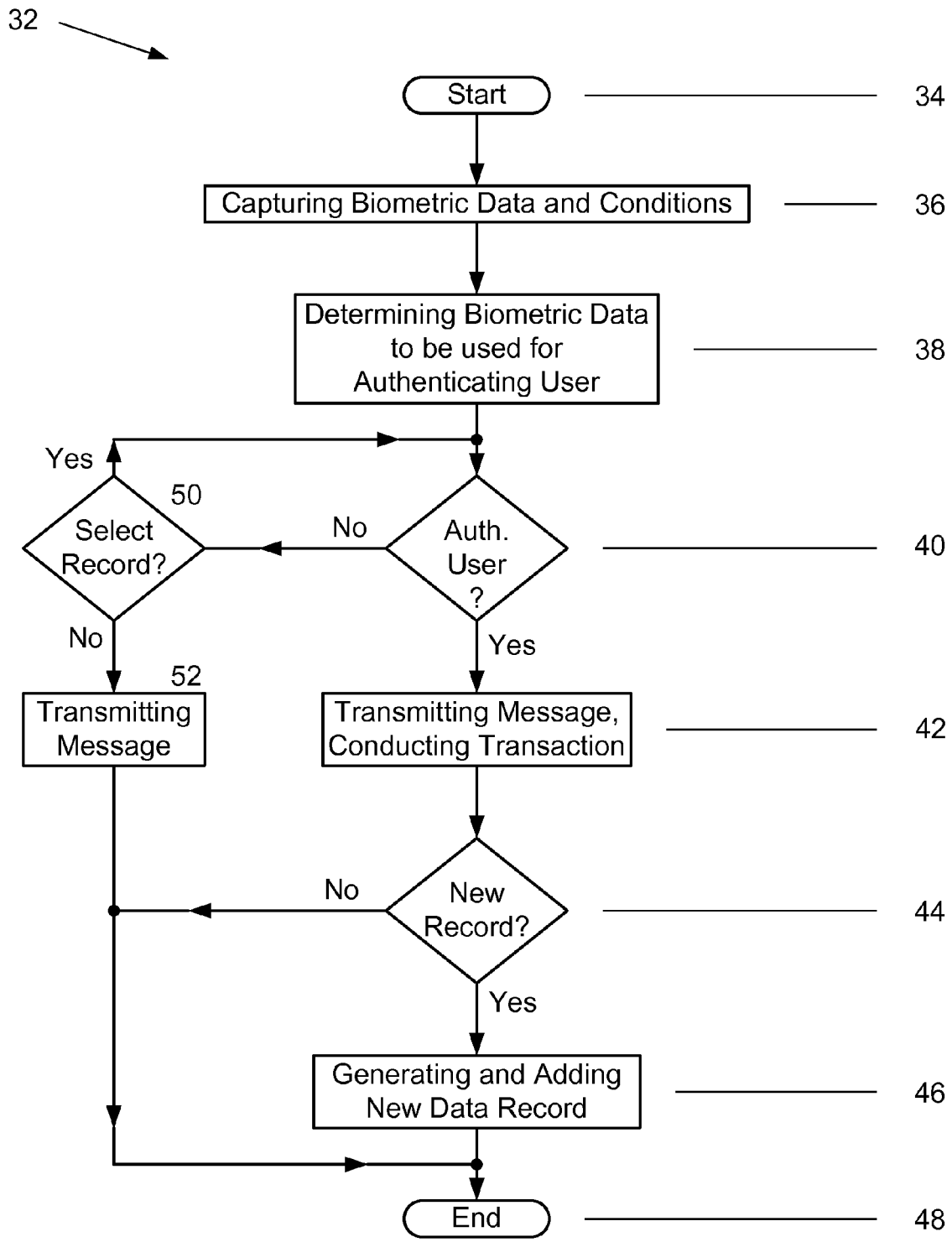
FIG. 5 is a flowchart illustrating an exemplary process for determining biometric data to be used in conducting an authentication transaction.

FIG. 5 is a flowchart 32 illustrating an exemplary process for determining biometric data, to be used in conducting an authentication transaction, most likely to result in a successful authentication. For CBAC system 10, the process starts 34 when the user of the communications device 12 is requested to provide desired biometric data to conduct an authentication transaction. The request for desired biometric data may be made of the user in any manner. For example, the request may be made by security personnel at an authentication station or through an electronic communication received by and displayed on the communications device 12 as part of a network-based communication.

Next, the user continues by capturing biometric data 36 corresponding to the desired biometric data from his self with his communications device 12. While capturing the desired biometric data, the communications device 12 automatically evaluates and captures the conditions existing during the authentication transaction. The conditions existing during the authentication transaction are also the conditions under which the communications device 12 operates. After capturing the desired biometric data and conditions 36, the communications device 12 verifies that the captured biometric data is of sufficient quality. If so, the communications device 12 automatically transmits the captured biometric data and associated conditions to the AC system 14. Otherwise, the user repeatedly captures the desired biometric data until biometric data of sufficient quality is captured. Upon capturing biometric data of sufficient quality, the communications device 12 automatically transmits the captured biometric data and associated conditions to the AC system 14. In the exemplary process the desired biometric data is two-dimensional face biometric data 26, and the authentication transaction condition is that the transaction location 28-1 is proximate the location defined by the coordinates of GPS-4. In alternative processes, the desired biometric data may be any biometric data that facilitates authenticating users as described herein, and the authentication transaction condition may be any condition that facilitates determining the data record 24 including the biometric data 26 most likely to result in a successful authentication.

The AC system 14 continues processing by determining 38 that stored biometric data corresponding to the desired biometric data, associated with conditions that best match the captured conditions, is to be used for authenticating the user. More specifically, the AC system 14 continues by comparing the captured biometric data against the biometric data 26 in the data records 24 of the user. As a result, the AC system 14 identifies data records 24 that include biometric data corresponding to the desired biometric data. After identifying data records 24-1 to 24-4 as including biometric data corresponding to the desired biometric data, processing continues by ranking the identified data records 24-1 to 24-4. More specifically, the AC system 14 continues by comparing the captured conditions against the conditions 26 included in each of the identified data records 24-1 to 24-4 and calculating a matching score for each comparison match.

Next, the AC system 14 continues by ranking the individual data records according to the matching scores. Thus, the AC system 14 ranks data records 24-4, 24-2, and 24-1 as the first, second and third highest ranking data records, respectively, and data record 24-3 as the lowest ranking data record. Data record 24-4 is ranked highest because the biometric data stored therein was captured at the location defined by the coordinates of GPS-4. Because the biometric data included in the highest ranking data record corresponds to the desired biometric data and is associated with conditions that best match the captured conditions, it is considered the stored biometric data most likely to result in a successful authentication. Thus, the biometric data included in the highest ranking data record is used for authenticating the user during an authentication transaction.

Processing continues by authenticating 40 the user. Specifically, processing continues by comparing the captured biometric data against the biometric data included in the highest ranking data record 24-4, and generating an authentication matching score. The authentication matching score is compared against a threshold to determine if the captured biometric data matches the biometric data included in the highest ranking data record 24-4. When the authentication matching score is at least equal to the threshold, the captured biometric data matches the biometric data in the highest ranking data record 24-4, and the identity of the user is successfully authenticated 40. Next, the AC system 14 continues by generating and transmitting a successful authentication message 42 to at least one third party entity different from the operator of the AC system 14 and different from the user of the communications device 12. The successful authentication message may also be transmitted 42 to the communications device 12 which displays the successful authentication message for the user to see.

The at least one third party entity may be any type of computing device, any type of communications device, or an individual associated with an organization such as, but not limited to, financial institutions, hospitals, and security agencies. After receiving the successful authentication message, the third party entity continues processing by conducting any type of transaction 42 executed contingent upon the successful authentication result. For example, the third party entity may conduct a network-based financial transaction initiated remotely by the user, may permit the user to remotely access confidential medical records, or may permit a user at a border crossing to enter the country.

After transmitting the successful authentication message 42, the AC system 14 continues processing by determining 44 whether or not the captured biometric data and associated conditions should be added to the data record set 22 as a new data record 24. Specifically, the AC system 14 continues by comparing the conditions captured during authentication against the conditions of each identified data record 24-1 to 24-4. When the conditions captured during authentication are different than the conditions 28 of each identified data record 24-1 to 24-4, the AC system 14 continues processing by generating 46 a new data record 24 including the captured biometric data and associated conditions, and adding 46 the new data record 24 to the data record set 22 of the user. Next, processing ends 48. Otherwise, when the conditions captured during authentication are the same as the conditions 28 of at least one of the identified data records 24-1 to 24-4, a new data record 24 is not generated and processing ends 48.

It should be understood that in this exemplary process, a new data record 24 may be generated and added to the data record set 22 after the identity of the user is successfully authenticated. However, a new data record 24 is not generated and added to the data record set 22 when the identity of the user is not successfully authenticated.

When the user is not successfully authenticated at operation 40, processing continues by selecting the next highest ranking data record 50, and authenticating the user 40 based on the biometric data included in the next highest ranking data record. In the exemplary process, the biometric data in each of the ranked data records may be used to conduct the authentication transaction 40 in an effort to achieve a successful authentication result. Thus, if the user is not successfully authenticated 40 using the biometric data of the highest ranking data record 24-4, the biometric data of the next highest ranking data record 24-2 is used to authenticate the user 40. Likewise, when the biometric data of data record 24-2 does not result in a successful authentication, the biometric data of data record 24-1 is used. When the biometric data of data record 24-1 does not result in a successful authentication, the biometric data of data record 24-3 is used. If a successful authentication result is not achieved using the biometric data from any of the ranked data records, processing continues by generating and transmitting an unsuccessful authentication message 52 to the at least one third party entity. Next, processing ends 48. When the authentication is unsuccessful, the at least one third party entity does not conduct a transaction. The unsuccessful authentication result may also be transmitted 52 to the communications device 12 which displays the unsuccessful authentication message for the user to see.

Although the exemplary process may conduct the authentication transaction using biometric data from each of the ranked data records 24 in an effort to achieve a successful authentication result, in other alternative processes biometric data from fewer than all of the ranked data records 24 may be used. Moreover, although the AC system 14 ranks the identified data records after biometric data is captured in the exemplary process, in alternative processes the AC system 14 may identify the data records 24 including biometric data corresponding to the desired biometric data, and rank the identified data records 24 prior to capturing the desired biometric data. In such alternative processes, the conditions of the authentication transaction are captured before the biometric data. In yet other alternative processes, the AC system 14 may rank the data records 24 including biometric data corresponding to the desired biometric data before the desired biometric data is captured, and again after the desired biometric data is captured.

Although a new data record 24 including biometric data and conditions captured during authentication may be generated after a successful authentication in the exemplary process, in alternative processes after a successful authentication a new data record 24 including biometric data different from the desired biometric data as well as associated conditions may also be generated by the AC system 14 and added to the data record set 22. For example, after generating the new data record 24 including the captured biometric data and associated conditions and adding 46 it to the data record set 22, the AC system 14 may automatically transmit a message to the communications device 12 prompting the user to capture biometric data different from the desired biometric data captured during authentication. After capturing the different biometric data as well as the conditions during capture, the communications device 12 may transmit the captured different biometric data and associated conditions to the AC system 14. Upon receiving the captured data, the AC system 14 generates another new data record including the captured different biometric data and associated conditions, and adds the other new data record 24 to the data record set 22. It should be appreciated that a new data record including the captured different biometric data and associated conditions may be generated and added to the data record set 22 when a new data record is not generated that includes the biometric data and conditions captured during authentication.

In the exemplary process, a new data record 24 is not generated and added to the data record set 22 unless there is a successful authentication. However, in alternative exemplary processes a new data record 24 may be generated and added to the data record set 22 after an unsuccessful authentication result. For example, a new data record 24 may be added to a data record set 22 after an unsuccessful authentication result in order to provide data for use in evaluating performance of an authentication computer system.

In the exemplary process, the conditions captured during authentication are compared against the conditions included in the identified data records to determine whether or not captured biometric data and associated conditions should be added to the data record set 22. In alternative processes, the captured conditions may be compared against each of the data records 24 included in the data record set 22.

Although the communications device 12 automatically transmits the captured biometric data and associated conditions to the AC system 14 in the exemplary process, in alternative processes the user may manually control transmission of the biometric data and associated conditions. In such alternative processes, after confirming that sufficient quality biometric data and associated conditions have been captured, the user may press a button 16 that causes the communications device 12 to transmit the captured biometric data and associated conditions to the AC system 14.

It should be appreciated that storing a data record set 22 for each user enrolled in the AC system 14, where each data record 24 includes biometric data 26 generally captured under different conditions, and selecting the data record 24 including biometric data 26 most likely to result in a successful authentication for conducting an authentication transaction, facilitates reducing biometric authentication accuracy loss resulting from conditions during authentication that are different from conditions during enrollment. By selecting the data record 24 including biometric data 26 most likely to result in a successful authentication for conducting an authentication transaction, biometric authentication transaction results are facilitated to be more accurate and biometric authentication system performance is facilitated to be enhanced.

In each embodiment, the above-described methods for determining biometric data most likely to result in a successful authentication facilitate improving the accuracy of biometric authentication transaction results as well as reducing the time and labor required to achieve a successful authentication result. More specifically, desired biometric data and conditions existing during an authentication transaction are captured and compared against biometric data and conditions, respectively, included in at least one data record of a data record set. Biometric data corresponding to the desired biometric data, associated with conditions that best match the captured conditions, is used to authenticate the identity of the user. As a result, biometric authentication system operation facilitates reducing the time and costs associated with generating accurate authentication results, and facilitates improving the accuracy of authentication results. Accordingly, biometric authentication system performance is facilitated to be enhanced in a cost effective and reliable manner.

Exemplary embodiments of methods for determining biometric data most likely to result in a successful authentication are described above in detail. The methods are not limited to use with the specific authentication computer systems described herein, but rather, the methods can be utilized independently and separately from other authentication computer components described herein. For example, the methods for determining biometric data most likely to result in a successful authentication described herein may be implemented in most authentication systems and may be used for a wide range of authentication scenarios, including unlocking an automobile door. Moreover, the invention is not limited to the embodiments of the methods described above in detail. Rather, other variations of the methods may be utilized within the spirit and scope of the claims.

While the invention has been described in terms of various specific embodiments, those skilled in the art will recognize that the invention can be practiced with modification within the spirit and scope of the claims.

What is claimed is:

1. A computer program recorded on a non-transitory computer-readable recording medium included in a condition-based authentication computer system for enabling increased accuracy of biometric authentication transaction results, the computer program being comprised of instructions, which when read and executed by the condition-based authentication computer system, cause the condition-based authentication computer system to:
   compare conditions under which a device operates during an authentication transaction against conditions included in user data records, the conditions being captured by the device, each data record including biometric data corresponding to desired biometric data and being associated with the user;
   calculate a matching score for each data record;
   rank each data record according to the matching score; and
   determine that biometric data included in the highest ranking data record corresponding to the desired biometric data is to be used for authenticating the user.

2. A computer program in accordance with claim 1 further comprising instructions, which read and executed by the condition-based authentication computer system, cause the condition-based authentication computer system to determine whether to select a next highest ranking record after generating an unsuccessful result with the highest ranking record biometric data.

3. A computer program in accordance with claim 1 further comprising instructions, which read and executed by the condition-based authentication computer system, cause the condition-based authentication computer system to assign greater weight to at least one condition that affects the quality of the desired biometric data.

4. A computer program in accordance with claim 1 further comprising instructions, which read and executed by the condition-based authentication computer system, cause the condition-based authentication computer system to:
   compare the captured conditions against the conditions included in at least one data record included in a user data record set; and
   generate a new data record when the captured conditions are different than the conditions in the at least one data record.

5. A computer program in accordance with claim 1 further comprising instructions, which read and executed by the condition-based authentication computer system, cause the condition-based authentication computer system to:
   select a next highest ranking data record after generating an unsuccessful authentication result with the highest ranking record biometric data; and
   authenticate the user based on the biometric data included in the next highest ranking data record.

6. A method for determining biometric data for use in an authentication transaction comprising:
   capturing, by a device, biometric data from a user and conditions under which the device operates;
   comparing the captured conditions against conditions included in data records with a processor, each data record being associated with the user and including biometric data corresponding to the captured biometric data, and calculating a matching score for each data record;
   ranking each data record according to the matching scores; and
   determining that biometric data included in the highest ranking record is to be used for authenticating the user.

7. A method in accordance with claim 6 further comprising determining whether to select a next highest ranking record after generating an unsuccessful result with the highest ranking record biometric data.

8. A method in accordance with claim 6, further comprising:
   generating a data record set for the user that includes at least one data record, the at least one data record including biometric data and associated conditions captured during an enrollment process; and
   storing the data record set in memory.

9. A method in accordance with claim 6, further comprising determining that the captured biometric data and conditions are to be added to a user data record set including at least one data record when the captured biometric data or the captured conditions do not match those of the at least one data record.

10. A method in accordance with claim 6, further comprising:
    comparing the captured conditions against the conditions included in at least one data record included in a user data record set; and
    generating a new data record when the captured conditions are different than the at least one data record conditions.

11. A method in accordance with claim 6, said determining step further comprising assigning greater weight to at least one condition that affects the quality of the captured biometric data.

12. A method in accordance with claim 6, further comprising conducting an authentication transaction with biometric data from each ranked data record.

13. A method in accordance with claim 6, further comprising generating a data record set for the user, the data record set comprising at least one user data record, the at least one user data record comprising biometric data and associated conditions captured during an enrollment process as well as biometric data and associated conditions captured during authentication transactions.

14. An authentication system for determining biometric data for use in authentication transactions comprising:
    a processor; and
    a memory configured to store data record sets, each set including data records for a different user, each record including a transaction condition, said processor programmed to:

compare transaction conditions under which a device operates during an authentication transaction against the data records in a user data record set, the transaction conditions being captured by the device, and calculate a matching score for each data record;
rank each data record according to the matching score; and
determine that biometric data in the highest ranking record is to be used during an authentication transaction.

15. An authentication system in accordance with claim 14, wherein said device is one of the following:
   a smart phone;
   a tablet computer;
   a personal digital assistant;
   a laptop computer;
   a personal computer; and
   a cellular phone.

16. An authentication system in accordance with claim 14, said processor being further programmed to generate the data record sets to each include an enrollment data record including biometric data and associated conditions captured during enrollment, and at least one data record including biometric data and associated conditions captured during authentication transactions.

17. An authentication system in accordance with claim 16, the data records including biometric data of at least one biometric modality, the biometric modalities comprising voice, face, iris, palm, and electrocardiogram, and any combination thereof.

18. An authentication system in accordance with claim 14, said device being further configured to:
   analyze captured transaction conditions; and
   derive conditions from the captured biometric data.

19. An authentication system in accordance with claim 14, said device being further configured to capture authentication transaction conditions, the conditions comprising:
   a location of an authentication transaction;
   a type of lighting during an authentication transaction;
   noise during an authentication transaction; and
   the temperature during an authentication transaction.

\* \* \* \* \*